(12) United States Patent
Kolze (10) Patent No.: US 6,290,139 B1
(45) Date of Patent: Sep. 18, 2001

(54) HYDRAULICALLY ACTUATED MIXING VALVE

(75) Inventor: Lawrence A. Kolze, Seneca, SC (US)

(73) Assignee: Kolze, Inc., Seneca, SC (US)

( * ) Notice: Subject to any disclaimer, the term of this patent is extended or adjusted under 35 U.S.C. 154(b) by 0 days.

(21) Appl. No.: 09/443,635

(22) Filed: Nov. 19, 1999

(51) Int. Cl.[7] .................... G05D 23/185; G05D 23/00
(52) U.S. Cl. ................. 236/12.11; 236/80.6; 236/84
(58) Field of Search .................. 236/12, 11, 12.12, 236/80 B, 80 G, 84

(56) References Cited

U.S. PATENT DOCUMENTS

| | | | |
|---|---|---|---|
| 2,844,321 | * 7/1958 | Witherspoon, Jr. | 236/84 X |
| 3,561,481 | 2/1971 | Taplin | 137/625.4 |
| 4,909,435 | * 3/1990 | Kidouchi et al. | 236/12.12 |
| 4,945,943 | * 8/1990 | Cogger | 236/12.12 X |
| 5,033,671 | * 7/1991 | Shiba et al. | 236/12.12 |

* cited by examiner

Primary Examiner—William Wayner
(74) Attorney, Agent, or Firm—Flint & Kim, P.A.

(57) ABSTRACT

A hot and cold water mixing valve to maintain the outlet water temperature at a preset level by using electronic sensors to actuate low voltage, pulse operated solenoid valves to regulate pressure in control passageways. The control passageway pressure differential across a drive diaphragm causes the diaphragm to move in response thereto to change the position of the main mixing valve. Minimum electrical energy is thus expended to regulate the temperature level.

33 Claims, 3 Drawing Sheets

HYDRAULICALLY ACTUATED MIXING VALVE

FIELD OF THE INVENTION

This invention relates generally to an integral, hydraulically actuated mixing valve for use most advantageously in conjunction with an electronic control system to regulate the mix temperature of hot and cold supply fluids.

BACKGROUND OF THE INVENTION

In recent years, the use of electronic control systems in plumbing fixtures has become increasingly popular. A deterrent to even more widespread use is believed to be mainly due to the greater cost compared to the basic mechanical type fixtures presently available. Although electronic control systems can provide desirable features, the cost and complexity of their installation tends to be a major drawback that prevents their full acceptance and use. Installation of standard manually operated plumbing fixtures requires only the services of a plumber, whereas installation of the electronic control system must include the labor cost for the electrical line power wiring needed to operate the mix actuator and the electronic controls. Another factor contributing to the installation cost of an electronic control system is the many separate components that must be installed.

Mixing valves presently used to control the mix temperature of hot and cold supply fluids have many different configurations and are installed frequently in plumbing fixtures such as showers and hand wash faucets. Mixing valves generally consist of two elements, the mix means for mixing the fluids and an actuator so that the mix means may vary the proportions of a hot and cold fluid to obtain a desired mix temperature. Both of the foregoing means are found in a great variety of forms, e.g., electric motors or solenoids in combination with poppet valves, gate valves, etc.

Presently, the electrical motor type actuator for mix proportioning and temperature control seems to be the most widely used. Although the electrical motor actuator has various desirable characteristics, such as adequate actuation forces and the capability of precision control, it inherently has various deficiencies for use as a mixing valve actuator. These deficiencies mainly are: relatively high electrical power consumption, especially when the electrical motor must move the mix means from extreme positions of hot to cold, cold to hot, and for other running adjustments which may require significant operation time. In some control systems, to provide a varying mix response, the electric motor actuator may require relays or other speed controls that could add extra complexity. Another objection to the electric motor actuator is that it needs a fluid-to-outside-air seal to separate it from the fluid of the mix mechanism. Since this is a moving or dynamic seal, it is subject to wear and eventual leakage. As this type of seal also needs sufficient compression forces to prevent fluid leakage, obtaining sufficient torques and low power consumption can also present problems. The fluid to air seal, in addition, is often subject to small seepages past the seal where dissolved minerals from the fluid precipitate out and can cause motor shaft binding. Mounting of the motor is another difficulty. If the motor shaft is not properly aligned with the seal, eccentric motion of the shaft with respect to the seal can occur causing either excess motor torque requirements, shaft binding, and uneven loads on the seal to cause premature fluid leakage. Since small electric motors for these applications have very high rotational speeds, they must be fitted with geared speed reduction units to provide adequate operating torque and a suitable speed reduction to operate the mix mechanism. Due to the high gear ratio, some means must be used to prevent the speed reduction output shaft from reaching an over torque condition that could result in speed reduction gear breakage. To overcome this problem, the electric motor needs a slip clutch, overtravel mechanism, or other means to protect the geared speed reduction from damage. All of these factors add to the complexity of the motor actuator or to the valve mix mechanism. As an example, where the motor operates a poppet type mix mechanism and the poppet is driven to its seated position, an abrupt increase of force occurs that could overstress the speed reduction gears unless some means is used to absorb or to divert the sudden force increase to the gears. Accordingly, one object of the present invention is to eliminate the need for the above mentioned seals and electric motor complexities. In achieving these objects a hydraulic actuator is employed and one such prior art actuator is shown in U.S. Pat. No. 3,561,481 to John F. Toplan which issued on Feb. 9, 1971.

Another object of this invention is to provide a single integrated packaged valve suitable for use in varied electronic control systems. The single integrated package will provide electronic control system designers and manufacturers the basic water mixing hardware for their control systems.

Still another object of this invention is to provide a mixing valve which will be operable with very low electrical power requirements. These low electrical operating requirements are the capability of a mixing valve to operate for long periods on readily available batteries. This capability has the advantage of eliminating the cost of an electrician for a power supply installation as is needed for a line powered mixing valve. In addition, the battery powered valve has the advantage of being operable even when a general electrical power outage occurs.

SUMMARY OF THE INVENTION

To meet the objectives as set forth above, a mixing valve combination has been surprisingly discovered which provides in a single integrated package the following elements having low power consumption requirements: (1) an electrically operated flow start and stop means, (2) a hot and cold fluid mix means, and (3) an electrically controlled actuator to operate the mix means. Optionally, the integrated package may include: (a) a temperature sensor that transmits electrical signals in response to the fluid mix temperature, (b) a mix fluid volume rate control device that complies with water conservation standards which limit maximum flow rate over a wide water supply pressure range, (c) a mechanical pressure balancing device which maintains relatively equal pressure fluid to the inlet passages of the water mix means in response to pressure swings in the hot and cold water supplies, and (d) a backflow check valve in the hot and cold valve inlet passages.

In one aspect the valve of my invention comprises a temperature sensor for transmitting signals in response to temperature variations of flowing water from a preset level and a main chamber having hot and cold water inlets; a resilient member for dividing the main chamber into a control chamber and a mixing chamber; an outlet for discharging the mixed hot and cold water, the sensor being associated with the outlet; two control passageways, one connecting the control chamber with the outlet side of the mixing chamber and the other connecting the control chamber with the inlet side of the mixing chamber; internal mixing means responsive to movement of said resilient member; and, a low voltage, pulse operated solenoid valve associated with each control passageway, each pulse valve being responsive to signals from said sensor to control water pressure in the respective associated passageway thereby actuating movement of the resilient member and said internal mixing means to change the proportions of hot and cold water.

In order to meet low electrical power requirements to insure adequate battery life, in one embodiment of the invention, magnetic latch solenoid valves are employed. The use of these types of valves provides a significant power saving in that only a milli-second electrical on-off pulse is required to operate the mix mechanism throughout its full operating range. This is in contrast to an electric motor operated valve that must be continually energized as it moves through its full operating range and thereby consumes considerably greater amounts of electrical power. Also in another aspect of the invention electrical power requirements are minimized by the use of latch valves for main fluid start and stop operations since they require only milli-seconds of electrical energy to perform these functions. Separation of the mix means and the main flow start-stop means also enables the mix section to retain its set point position when the main flow is frequently started and stopped. The start/stop valves for flow function also eliminates the need for a leak-tight seal for the mix mechanism in shut-off and thereby adds to simplicity, reliability, and lowers mix section operating force requirements to also lower electrical power consumption.

In still another aspect of the invention, to further reduce mixing valve electrical power requirements, a pressure balancing valve may be added as another embodiment of the mixing valve package. The purpose of the balancing valve is to minimize the magnitude of pressure fluctuations which can cause a change from a mixing temperature set point and the elimination or reduction of these fluctuations by the balancing valve reduces the need for the mixing mechanism to be electrically actuated to regain its set point temperature. In this way the balancing valve reduces significant electrical power usage. In another way, the balancing valve also allows further power savings by providing equalized pressures to the hot and cold inlet passages of the mix mechanism. The equalized pressures essentially provide a force balance across an unbalanced pressure mixing mechanism to allow actuation of this mechanism to operate with minimal forces and minimal electrical power.

The valve of the present invention is provided with pressure drop means which can be characterized as the internal friction in the main chamber of the valve resulting from the particular valve design, that is, the valve must be designed with sufficient pressure drop across it so that an adequate force differential is available through the control passages to move the hydraulically moveable member.

From an electrical power standpoint, the temperature sensor may be readily designed into an electronic control system for minimal power consumption and, therefore, reduction of its power consumption is not an object of this invention.

Other elements making up the mixing valve package such as the flow rate control and backflow check valves are completely mechanical and, therefore, do not consume electrical power.

Although the present invention primarily focuses on total electronic control, the mix valve may also utilize a mechanical type temperature sensor and control actuator such as a bimetal type or other alternatives to the electrical actuated control valves and electronic sensor.

In these applications, the mixing valve is adjusted for a single nominal mix temperature allowing the electronic control system to be greatly simplified as it no longer needs to control mix temperature but only provides the on/off control of main flow through the mix valve. Obviously these systems are low in cost and are applied in systems where some electronic system control is desired but not to the degree where mix temperatures can be continually varied. These systems are ordinarily limited to commercial hand wash faucet applications, but still have wide application and appeal.

Accordingly, by a combination of lower energy consuming components, the use of mechanical devices to lower mix mechanism power operating requirements, and the reduction of actuations due to pressure fluctuations, I have provided the means to achieve a very low power consumption mix valve assembly for a practical battery powered electronic hot and cold fluid mix system.

Although a basic objective of this invention is to provide a mixing valve package of low electrical power consumption as described above and suitable for battery power operation, the combination of all or part of the elements may also be applied to applications where utility supplied line power is preferred or required. Therefore, my invention is not limited to battery powered devices.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

The integrated mixing valve package of the present invention may be furnished in a great variety of options, from the basic mix mechanism and its actuator, to all its available embodiments. Since the package contains the essential sensors, electrical actuators, mechanisms and controls, the electronic system may be designed around these basic elements. In addition, a high degree of quality control is achieved since the integrated components within this mixing valve are uniformly supplied in a single source manufacturing facility. This uniformity of the mixing valve elements provides electronic control designers more known operational hardware and help to assure proper functioning of the entire control system knowing that the integrated mixing valve components meet the specifications that the electronic control system was designed toward. In contrast, in an electronic control system where the mixing valve is not an integral package as herein described and various elements are separately installed, a much greater likelihood exists for substitute components to be used. This could result in an inferior or failure prone system. In addition, by the use of an integrated package of the basic system components, considerable installation cost savings over separate component installation is achieved. Although the mixing valve package offers the major needs of a basic electronic control system, additional sensors, valves, etc., that might be needed for additional features to the basic mix valve control could be added to any installation as desired or needed. Similarly, the mixing valve package could be supplied with minimal components as needed in the electronic system design.

Figure 1:
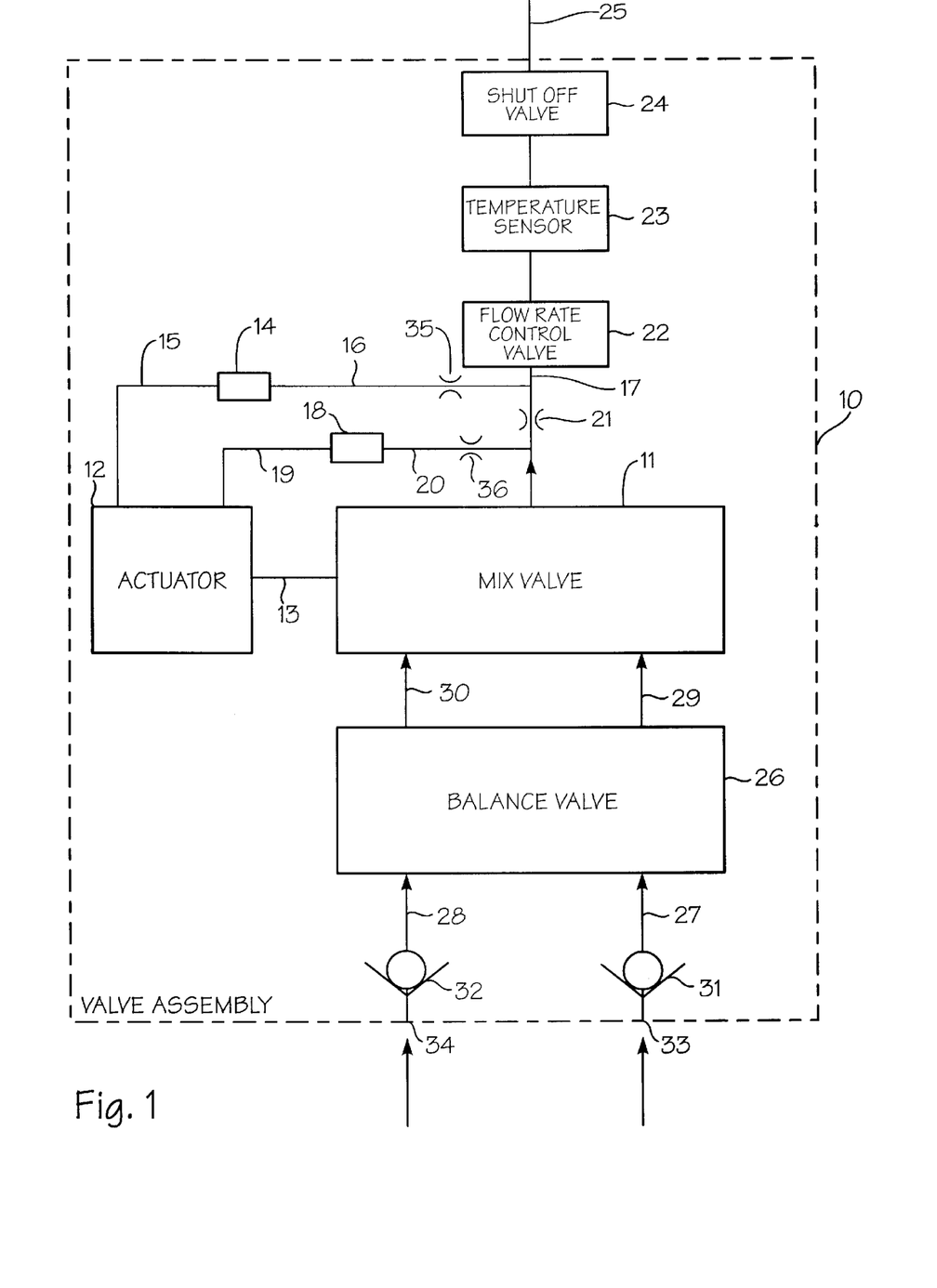
FIG. 1 is a block diagram of the invention depicting the elements of an integrated mixing valve assembly for use in an electronic control system.

Referring first to FIG. 1, the block diagram generally illustrates features of the invention which are a combination of control and valve elements to form an assembly generally indicated at 10 and in combination with a mix valve 11, a mix valve actuator 12, with a connecting member 13 for operating mix valve 11, an electric operated valve 14 disposed between fluid control passages 15 and 16 which connect to outlet passage 17 of mix valve 11 and to actuator 12. Another electrically operated valve 18 is disposed between fluid control passages 19 and 20 which connect with actuator 12 and outlet passage 17 of mix valve 11. Control passage 20 is connected to outlet passage 17 upstream of control passage 16 to provide the needed pressure drop to operate actuator 12. Orifice 21 is placed between control passage 20 connection and control passage 16 connection to provide additional pressure drop if needed to operate actuator 12. Also in communication with outlet passage 17 is a flow rate control 22, a fluid temperature sensor 23 capable of transmitting electrical signals with fluid temperature changes, and an electrically operable valve 24 which permits and prevents flow therethrough, and an outlet port 25 of the assembly 10. Assembly 10 also comprises a balancing valve 26 with inlets 27 and 28 and outlets 29 and 30, backflow prevention valve 31 is disposed between assembly inlet port 33 and balancing valve inlet 27 and backflow prevention valve 32 is disposed between assembly inlet port 34 and balancing valve inlet 28.

The supply of fluids of different temperature to inlet ports 34 and 33 permits the flow of fluid from inlet port 34, through backflow prevention valve 32, through balancing valve inlet 28 and outlet 30 into mix valve 11; similarly, fluid supplied to inlet port 33, flows through backflow prevention valve 31, through balancing valve inlet 27 into balancing valve 26 and its outlet 29 into mix valve 11. The fluids supplied at inlets ports 33 and 34 reaching mix valve 11 as described, flow from mix valve 11 as a mixture into outlet passage 17, through flow rate control 22, to temperature sensor 23, through electrically opened valve 24, and then to assembly outlet port 25 to a shower or hand wash fixture connection. The balancing valve 26 provides equalization of pressures between passages 29 and 30 should supply pressures at inlets 33 and 34 fluctuate to upset mixture proportioning and thereby mix temperature control at outlet passage 17. Backflow prevention valves 31 and 32 prevent interflow through mix valve 11 when supply pressures at inlets 33 and 34 undergo pressure differences. Other or more detailed aspects of backflow prevention valves 31 and 32, balancing valve 26, flow control 22, temperature sensor 23, and shut-off valve 24 are commercially available and are well known to those familiar in the state of the art and need no further explanation.

In FIG. 1, mix valve 11 through an internal mix means is operated by a hydraulic actuator 12 via the connecting member 13 which proportions the two different temperature incoming fluids at 29 and 30 and to a mix discharge passage 17. As mix flow passes through passage 17, a pressure drop is created between upstream control passage 20 and a downstream passage 16 by the internal pressure drop means. The pressure differential thus created between control passage 20 and 16 is applied to a pressure responsive hydraulic actuator 12 by opening control valve 14 or 18 and thereby moving the mix means through connecting member 13 to proportion the supply hot and cold fluids in accordance to a desired fluid mix temperature in passage 17 and as sensed by temperature sensor 23. Closure of control valves 14 and 18 remove the actuation differential pressures across the hydraulic actuator 12 and thereby fixes its and the mix means position and mix flow temperature. Variable millisecond pulses to open and close control valves 14 and 18 move the hydraulic actuator to incrementally change the proportioning of hot and cold supply fluids to produce the required mix temperature. The temperature sensor 23 detects and transmits signals of mix temperature to an electronic control system (not shown) which through an electronic feedback loop opens and closes control valves 14 and 18 to effectively control mix temperature in outlet passage 17.

Flow rate control 22 maintains a constant rate of flow through mix passage 17 to obtain a constant pressure difference between control passages 20 and 16 whereby for a given open and close time of control valves 14 and 18 the movement of hydraulic actuator 12 remains constant over large pressure differentials across the mixing valve and facilitates control of the mix proportioning of the hot and cold supply fluids. By the addition of parallel control passages with different sizes of orifices 35 and 36, multiple actuator movement rates may be obtained. Several actuator speed changes may be obtained by electrical actuation of a control valve located in several different control passages having different orifice sizes to control the rate of flow to and from the actuator. This is useful where rapid mix flow from one extreme temperature to other extreme is required, or where slow or very small incremental changes are needed for accurate temperature control. Without flow rate control 22, for a given incremental time to open and close of control valve 14 and 18, hydraulic actuator 12 movement will vary according to the varying flow pressure difference between control passages 20 and 16. Although flow control 22 is not essential to the mix valve operation, its use is generally preferred.

Figures 2, 3:
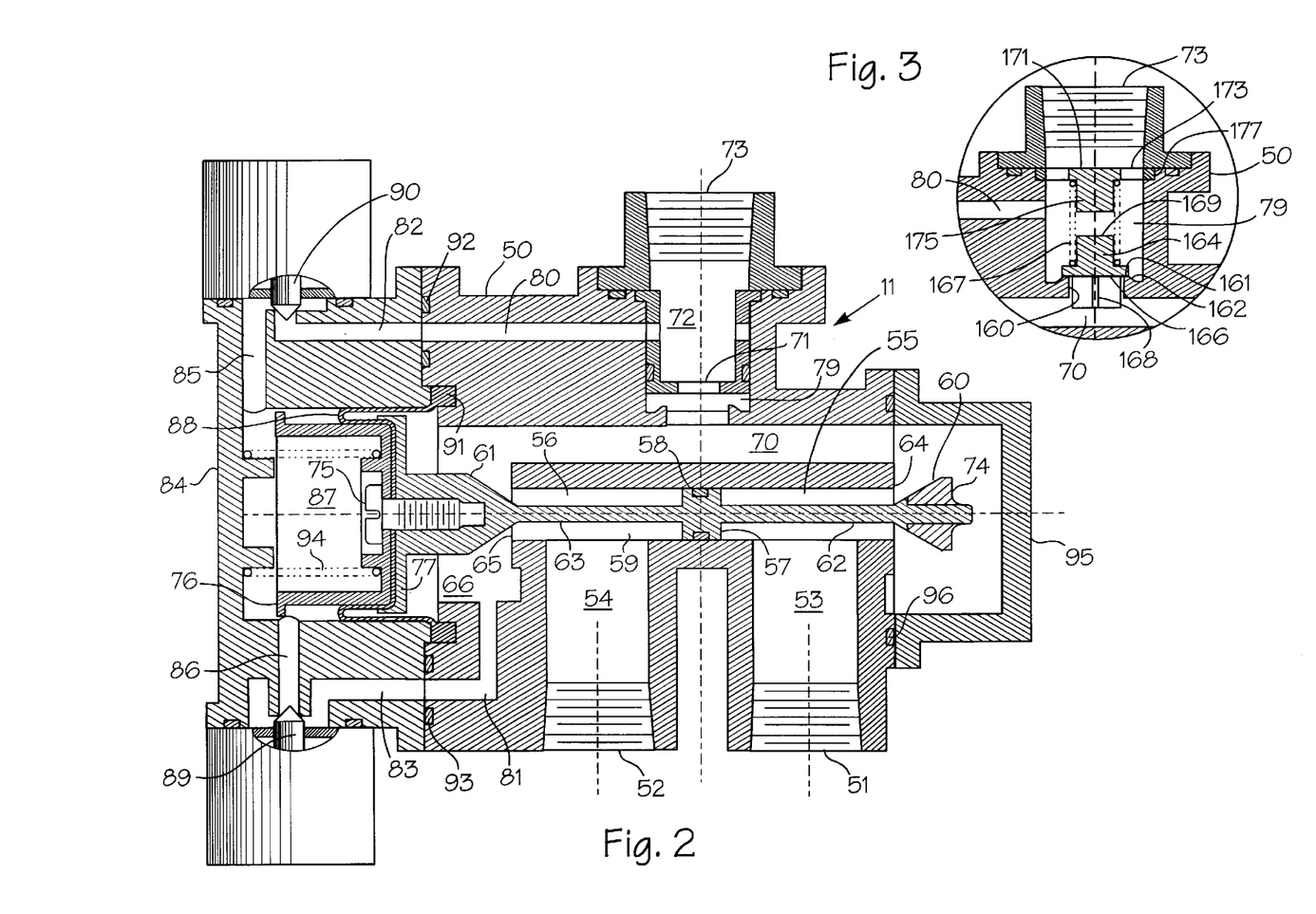
FIG. 2 is an embodiment of the invention incorporating a balanced poppet mixing mechanism, temperature control valves, and a diaphragm actuator.
FIG. 3 is an embodiment of the invention incorporating a spring loaded pressure drop device disposed in the outlet of the embodiment of FIG. 2; and, FIG. 4 is another embodiment of the invention incorporating a rotating disk mixing mechanism, temperature control valves, and dual diaphragm actuator.

Referring to FIG. 2, the preferred embodiment of a mix valve and actuator assembly is generally indicated at 11 with a housing 50, fluid inlets 51 and 52 with respective fluid passages 53 and 54 communicating with passages 55 and 56, all of generally circular cross-section, passages 55 and 56 separated by a slidable piston member 57 and sealed thereabout with seal ring 58. Piston 57 is attached to poppet valves 60 and 61 by respective members 62 and 63 to form a shuttle assembly 59 to reciprocate poppets 60 and 61 through a distance limited by contact of respective poppets to their respective seats 64 and 65. Poppet 60 is fastened to assembly 59 with a spring clip 74, a screw 75 fastens elastomeric diaphragm 88 between guide member 76 and end flange 77 of poppet 61, diaphragm 88 with shuttle assembly 59 is biased by spring 94 to normally close poppet 61 against seat 65 and move poppet 60 away from its seat 64. Shuttle assembly 59 is a pressure balanced assembly where the diametral pressure area of piston 57 balances the pressure area of poppet 60 and 61 and permits operation of shuttle assembly 59 with a minimal force bias spring 94. Alternatively, to eliminate spring 94, bias to shuttle assembly 59 can be obtained by utilizing a relatively larger pressure balance area of piston 57 than the pressure area of poppet 61. Within housing 50 and downstream to seats 64 and 65 is formed a mix chamber 70. An orifice 71 is disposed between mix chamber 70 and a mix passage 72 which terminates at outlet 73. Housing 50 also contains control passages 80 and 81 which communicate with passages 82 and 83 of actuator body 84 mounted to housing 50. Within actuator body 84 an electrically operated open and close member 90 is disposed between control passages 82 and 85 to permit and prevent passage of fluid from chamber 87 through control passages 85, 82, into control passage 80, and to mix passage 72. An electrically operated open and close member 89 disposed between control passages 83 and 86 permits and prevents fluid flow from chamber 66 through passages 81, 83, and 86 to chamber 87. Elastomeric diaphragm 88 with an annular bead 91 formed about its outer periphery provides a fluid seal between housing 50 and actuator body 84. Elastomeric seal rings 92 and 93 are disposed between passages 80 and 82 and between passages 81 and 83 to complete the fluid seals for attachment of body 84 to housing 50. An end cap 95 with ring seal 96 is mounted to housing 50 to complete the mix valve and actuator assembly.

In the embodiment of FIG. 2, proportioning between the supply of different temperature fluids introduced into inlets 51 and 52 for temperature control at outlet 73 is determined by the axial positioning of the shuttle assembly 59. Positioning of shuttle assembly 59 is accomplished by the opening and closing of control members 89 and 90 which control the volume of fluid in chamber 87. An open position of member 90 communicates the pressure of mix passage 72 to chamber 87 to create a pressure differential across diaphragm member 88 to produce a force to overcome force of spring 94 to move poppet 61 away from its seat 65 to increase flow from supply passage 54 and at the same time poppet 60 moves closer to seat 64 to decrease the supply of fluid at 53 wherein both fluids flow together into mix chamber 70, across orifice 71, mix passage 72, and outlet 73. Closure of member 90 removes the differential pressure across diaphragm 88 and thereby fixes the axial position of the shuttle assembly 59 and the proportions of flow through poppets 60 and 61. An open position of member 89 communicates chamber 87 with chamber 66 to permit flow from chamber 66 to chamber 87 and thereby allows spring 94 force to move shuttle assembly 59 toward closure of poppet 61 and opening of poppet 60. Closure of member 89, prevents flow to chamber 87 from chamber 66 to stop any further movement of shuttle assembly 59 and thus fixes the mix proportions in chamber 70 and mix passage 72. Open time of members 89 and 90 determines the axial movement and positioning of shuttle 59 and the distance poppets 60 and 61 move toward or from their respective seats 64 and 65 and thereby proportion the flow of fluid from passages 53 and 54 to mix chamber 70. Lengthy open time intervals of members 89 or 90 result in large axial movements of shuttle 59 as may occur when desired mix temperature is changed from one extreme to another. If members 89 and 90 utilize electrically operated magnetic latch valves, the shuttle assembly 59 may move with extremely low electrical power requirements through its extreme travel range by a few milli-second single electrical pulses required to open and close members 89 and 90. If small incremental positioning of shuttle assembly 59 is needed for most accurate fluid proportioning and mix temperature control, members 89 and 90 would be electrically pulsed to open and close at their minimum milli-second time capability. Depending upon accuracy of mix temperature control needed, several milli-second pulse cycles between members 89 and 90 could occur until a selected mix temperature was satisfied whereupon no additional electrical pulses and electrical energy consumption would be needed as position of shuttle assembly 59 and therefore fluid proportioning would be maintained.

The pressure drop means, in FIG. 2 for example, comprises the internal flow path configuration within the valve. This flow path creates the fluid flow pressure drop as it flows from chamber 66 through mix chamber 70 to outlet passage 72. The described flow path pressure drop can be increased or decreased to provide less or more pressure drop depending upon the force needed to act against the spring member 94.

In conjunction with FIG. 2, FIG. 3, illustrates an embodiment comprising a valve housing 50, and within housing 50, a chamber 70, an inlet bore 160, a passage 79, and a control passage 80, all in communication with outlet fitting 73 for the discharge of mix fluid flow. An annular valve seat 161 formed coaxially within passage 79 and a boss 162 extending from inlet bore 160 and upstream of control passage 80, a pressure responsive member 164 having an effective pressure area formed by surface 166 to contact seat 161 and a fluted member 168 to slidably engage with wall of bore 160 to guide member 164 and surface 166 to contact seat 161, a bias spring 167 engages a boss 169 to bias member 164 and its effective pressure area of surface 166 toward seat 161 to create a fixed pressure drop across seat 161 and surface 166; a spring retainer 171 is sandwiched between outlet fitting 73 and housing 50 to secure spring retainer 171 in a fixed position.

Referring again to FIG. 3, when a flow from chamber 70 to outlet 73 is variable but is within the design flow range for a faucet type application, typically from 0.5 to 2.5 GPM, spring 167 force acts through member 164 and thereby to the effective pressure area of surface 166 and against the flow to produce a pressure drop across the opening created by flow between seat surface 161 and surface 166. Movement distance of surface 166 and of member 164 from seat surface 161 establishes a flow area needed to maintain the pressure drop as established by the spring 167 design force and the design effective pressure area of surface 166. Therefore, for any given flow rate within the design limits selected, surface 166 will vary in distance from seat surface 161 to provide a variable flow area across which is maintained a constant pressure drop by the design spring 167 force acting against the designed effective pressure area of surface 166. Thus, in reference to both FIG. 3 and FIG. 2, since the desired constant pressure drop with variable flow rates is maintained by the variable flow area across seat surface 161 and surface 166 and therefore also across the flow communication from chamber 66 to control passages 80, 82, the relatively constant pressure drop across pressure responsive member 88 is also attained when actuator 90 is in an open position.

The FIG. 2 embodiment is most applicable to shower controls where the flow rate control is normally maintained at a single 2.5 GPM value. The embodiment of FIG. 3, for use in the valve of FIG. 2, is most applicable for hand wash faucet applications where aerator flow controls vary over a considerable range of flow (usually 0.5 to 2.5 GPM). Choice of embodiment would be based upon application and the justification of operational flexibility offered by the FIG. 3 configuration to its added incremental cost.

Figure 4:
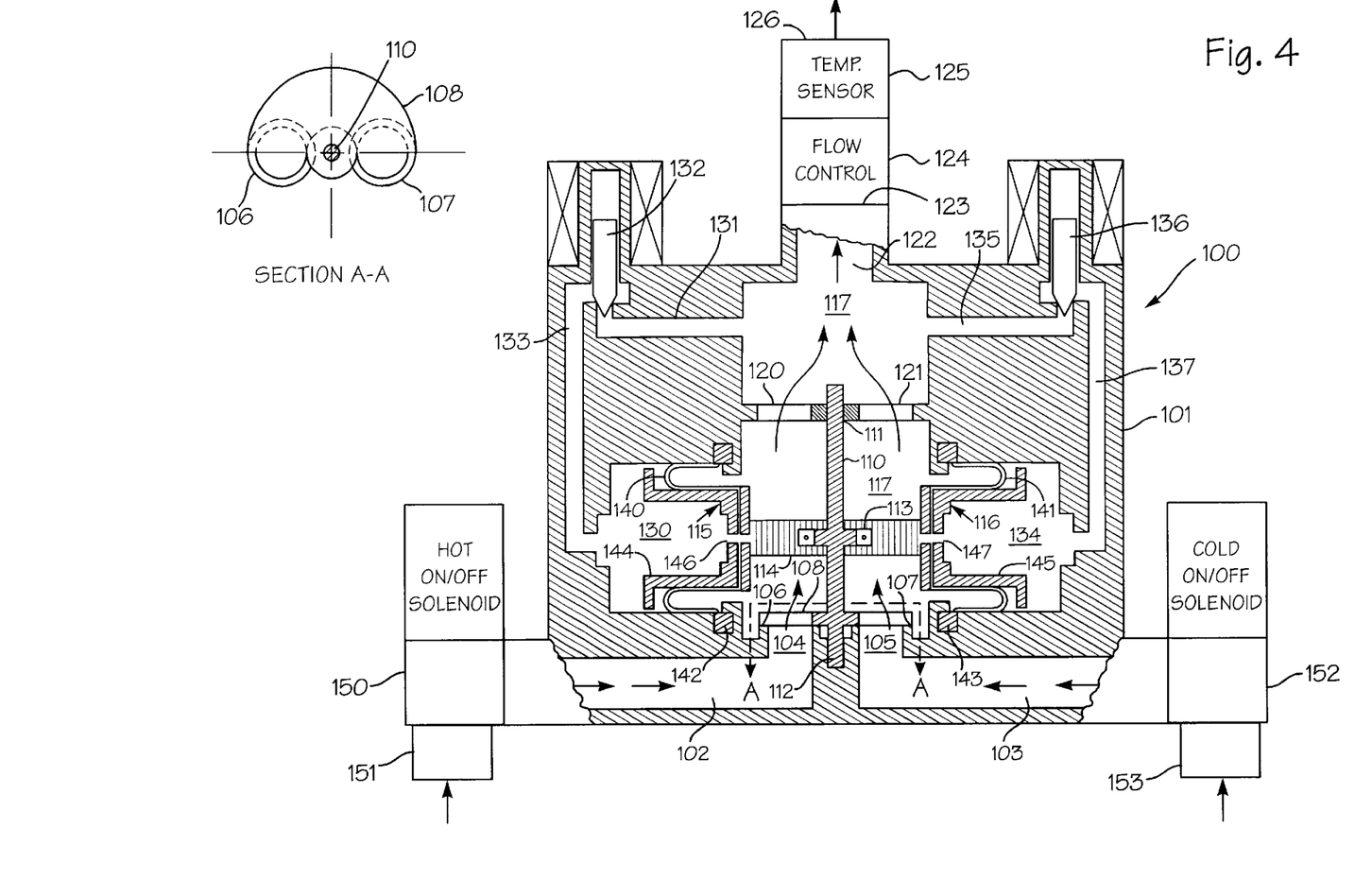

Referring now to FIG. 4, another embodiment of the invention is illustrated at 100 with a housing 101 comprising fluid inlet passages 102 and 103 of generally circular cross-section, communicating with passages 104 and 105 terminating to aperture 106 and 107 in slidable contact with a rotatable mix disk 108 fastened to shaft 110 which rotates in bearings 111 and 112. Attached to shaft 110 is a pinion gear 113 that meshes with a rack gear 114 to drive pinion gear 113 and rotatable mix disk 108. A piston assembly 115 attached to one end of rack gear 114 and a piston assembly 116 attached to its opposite end, permit piston assemblies 115 and 116 to reciprocate rack gear 114 for rotation of pinion gear 113, shaft 110, and mix disk 108 whereby the fluid passage areas of apertures 106 and 107 can be varied by the position of mix disk 108. Within housing 101 and downstream of apertures 106 and 107 is formed a mix chamber 117 with restrictor openings 120 and 121 disposed in mix chamber 117. Flow rate control 124, and temperature sensor 125, outlet 126, communicate with flow passage 122 and chamber 117. Mix chamber 117 communicates with chamber 130 through control passage 131, electrically controlled open-close member 132 and control passage 133. Mix chamber 117 also communicates with chamber 134 through control passage 135, electrically controlled open-close member 136 and control passage 137. Piston assembly 115 and 116 contain a diaphragm 140 and 141 with a bead 142 and 143 about their outer periphery for a fluid seal between respective chambers 130 and 134 and mix chamber 117. The elastomeric diaphragms 140 and 141 are attached to piston 144 and 145 and contain an orifice 146 disposed between chamber 130 and mix chamber 117, and an orifice 147 disposed between chamber 134 and mix chamber 117.

Mounted to housing 101 are electrically operated on/off valves 150 and 152. Valve 150 controls fluid flow to passage 102 from a supply fluid introduced at inlet 151 of on/off valve 150 while electrically operated on/off valve 152 controls fluid flow to passage 103 from a second supply fluid introduced at inlet 153 of on/off valve 152.

In FIG. 4, when a relatively hot fluid is supplied at inlet 151, and a relatively cold fluid is supplied at inlet 153 of the electrically opened valves 150 and 152, hot fluid flows through passages 102, 104, and through variable flow area aperture 106 and cold fluid flows through passages 103, 105, and through variable flow area aperture 107 where both fluids discharge and mix into chamber 117 to provide a mix temperature in proportion to the flow area at apertures 106 for the hot fluid and the flow area at aperture 107 for the cold fluid as determined by the rotational position of mix disk 108. Mix fluid then flows into chamber 117 through restrictor openings 120 and 121 into mix passage 122, through flow rate control 124 and temperature sensor 125, and outlet 126 to a shower or faucet fixture (not shown). Temperature control of the mix flow is attained by the opening and closure of the open-close control members 132 and 136. When member 132 is opened, a flow path is created from the upstream side of chamber 117 through orifice 146 into chamber 130, flow passages 133, 131, and through open control member 132 to the downstream side of chamber 117. The flow through orifice 146 produces a pressure drop across piston assembly 115 and diaphragm 140 to produce a force to move piston assemblies 115, 116, rack gear 114, to rotate pinion 113, shaft 110, and mix disk 108 to vary aperture 106 and 107 area to proportion the hot and cold fluids from passages 102 and 103 for mix temperature control. Closure of member 132 removes the pressure drop and force across piston assembly 115 to stop its motion, that of gear rack 114, and rotation of mix disk 108 and thereby fixes aperture 106 and 107 areas to maintain the hot and cold fluid proportions at that mix disk position. Open and close actuation of open close member 136 causes motion of piston assembly 116, gear rack 114, and disk 108 in a similar manner as described for the actuation of open close member 132 except mix disk 108 rotates in opposite direction. Thus as control members 132 and 136 are opened and closed, mix disk 108 is rotated in one direction or another to vary area of aperture 106 and 107 and thereby vary the proportions of hot and cold fluids for mix temperature control. Relatively long open time periods of open-close members 132 and 136 provide relatively large changes in mixture temperatures whereas relatively short open time periods result in small mix temperature changes for more accurate temperature control. Flow rate control 124 is used to maintain a relatively constant mixture flow rate irrespective of fluid supply pressure changes at inlet passages 102 and 103. Since the mixture flow rate through mix chamber 117 and restrictor openings 120 and 121 are maintained relatively constant, a constant pressure drop through mix flow chamber 117 is also maintained. Restrictor openings 120 and 121 can be removed, increased or decreased in size to provide a desired pressure drop across chamber 117 to provide the forces needed across piston assembly 115 and 116 for actuation of mix disk 108. This constant pressure drop, the same as the pressure drop across piston assembly 115 when member 132 is opened and across piston assembly 116 when member 136 is opened, provides a constant rotational movement of mix disk 108 for a given open time of member 132 or 136 even though fluid pressure changes, in supply passages 102 and 103 occur. Without flow rate control 124, pressure changes in these supply passages would cause increases or decreases in flow and pressure drop across chamber 117 and cause a variable rotational movement of mix disk 108 for a given open time of member 132 or 136. Although functional operation of the mix valve assembly 100 could still be attained without flow rate control 124, rotational positioning of disk 108 and mix temperature control would be more difficult.

Although certain preferred embodiments have been shown and described herein, it should be understood that many changes and modifications may be made therein without departing from the scope of the appended claims.

I claim:

1. A hydraulically actuated mixing valve for operation within a system for controlling the flow and temperature of hot and cold fluids comprising:
   a) a housing having a main chamber comprising:
      i. hot and cold fluid inlets for receiving hot and cold supply fluids and an outlet for discharging mixed hot and cold fluids;
      ii. a hydraulically movable member disposed within said main chamber, said hydraulically movable member having a high pressure side and a low pressure side, said hydraulically movable member being responsive to fluid pressure differentials;
      iii. a mixing chamber formed within said main chamber to mix said hot and cold supply fluids for discharge to said outlet;
      iv. internal mixing means associated with said mix chamber, said internal mixing means responsive to movement of said hydraulically movable member;
      v. pressure differential means within said housing and in a flow path relationship with said inlet, said mix means, and said outlet for providing sufficient pressure differential across said hydraulically movable member to actuate the movable member and consequently move said mixing means, said pressure differential means being a separate member from said mixing means;
      vi. at least two control passageways, one connecting said high pressure side of said hydraulically movable member to an upstream side of said pressure differential means and the other connecting said low pressure side of said hydraulically movable member to a downstream side of said pressure differential means; and, vii. a control valve associated with at least one of said control passageways to control fluid flow in said control passageway thereby actuating movement of said hydraulically movable member and said internal mix means to change the proportions of hot and cold fluids for mixture temperature control.

2. The valve of claim 1 wherein said control valve is electrically operated.

3. The valve of claim 1 including a pressure balancing valve for providing substantially equal fluid pressure at said hot and cold inlets.

4. The valve of claim 1 including a flow rate control means positioned in said flow path for maintaining a substantially constant flow rate from said inlets to said outlet and to establish a substantially constant pressure differential means.

5. The valve of claim 1 including a temperature sensor associated with said control valve to control flow in said control passage in response to said mixed hot and cold fluid temperature variations thereby permitting or preventing movement of said hydraulically moveable member and said internal mixing means to change or maintain the proportions of hot and cold fluid for fluid mixture temperature control.

6. The valve of claim 5 wherein said temperature sensor transmits electrical signals in response to mixed fluid temperature changes to control said control valve.

7. The valve of claim 1 including a valve means to permit and prevent fluid flow through said inlets and said outlet.

8. The valve of claim 7 wherein said valve means is electrically operated.

9. The valve of claim 8 wherein said electrically operated valves are operated by electrically actuated magnetic latch means.

10. The valve of claim 1 having check valves downstream of said inlets to prevent backflow between said hot and cold fluid supplies.

11. The valve of claim 10 wherein said check valves are an integrated unit.

12. A mixing valve as a part of a control system for maintaining a flowing mixture of hot and cold fluids at a relatively constant preset temperature level comprising:

a) hot and cold fluid inlets for respectively receiving said hot and cold fluids and an outlet for discharging fluids mixed therein;

b) a main chamber within said mixing valve, said main chamber having a differential pressure responsive hydraulically movable member and a mixing chamber disposed therein said mixing chamber being disposed to receive said hot and cold fluids from said mixing valve inlets and to discharge mixed fluid through said mixing valve outlet, said hydraulically movable member being in a fixed mixing position when the differential pressure across said pressure responsive hydraulic movable member is zero;

c) internal valve mixing means associated with said mixing chamber for controlling the proportions of hot and cold fluid admitted to said mixing chamber through said inlets, and said internal valve mixing means being actuated by movement of said hydraulically moveable member;

d) a substantially constant pressure differential means across said hydraulically movable member to provide a pressure differential across said hydraulically moveable member to permit movement thereof and to thereby move said mix means to change proportions of said hot and cold fluids;

e) a control passageway connecting an upstream side of said pressure drop means with said, hydraulically movable member, said control passageway having an electrically operated valve associated therewith for permitting and preventing the flow of fluid therethrough; and, f) a control passageway connecting a downstream side of said pressure drop means with said hydraulically movable member, said control passage having an electrically operated valve associated therewith for permitting and preventing the flow of fluid therethrough.

13. The valve of claim 12 wherein hydraulically moveable member is a diaphragm.

14. The valve of claim 13 wherein said diaphragm is spring biased to reverse the direction of the hydraulically moveable member.

15. The valve of claim 12 including a balancing valve for maintaining substantially equal water pressure at said hot and cold inlets.

16. The valve of claim 12 including a constant flow rate control means having means for maintaining flow rate of fluid at a pre-set constant rate and thereby establish said constant pressure differential means.

17. The valve of claim 12 including a temperature sensor associated with said outlet and discharge of mixed hot and cold fluids, said sensor being adapted to transmit electronic signals in response to changes in discharge water temperature from said preset level to said electrically operated valve for respectively opening and closing said control valves thereby causing said hydraulically moveable member to actuate internal valve mix means to move and change the proportion of hot and cold fluids to maintain the preset temperature.

18. The valve of claim 12 including an electrically operated valve means to permit and prevent flow through said inlets and said outlet.

19. The valve of claim 17 where said electrical operated valves are operated by an electrically actuated magnetic latch means.

20. The valve system of claim 19 including a battery as the electrical energy source.

21. A method of providing a controlled mix temperature of hot and cold flowing fluids to achieve a selected mixed fluid temperature, said method requiring relatively low energy to operate, comprising the steps of:

a) providing a mixing valve having a mixing chamber, hot and cold fluid inlets, and mixed fluid outlet:

b) providing control passageways;

c) providing a control valve to control fluid flow in at least one said control passageway;

d) providing a hydraulically moveable member responsive to fluid flow to and from said control passageway;

e) providing means for dividing said main chamber into a control chamber and a mixing chamber and for controlling the flow therebetween, said mixing chamber being in communication with said inlets and outlet;

f) providing mixing means within said mixing chamber for proportioning the hot and cold fluid entering said inlets for discharge from said outlet, said mixing means being actuated by the movement of said hydraulically moveable member dividing means;

g) establishing a substantially constant pressure drop means across said control chamber to permit said hydraulically moveable member to move said mix means upon actuation of said control valve;

h) monitoring said mixed fluid outlet temperature; and, i) hydraulically increasing and decreasing the volume of said control chamber in response to outlet water temperature whereby a small increase or decrease in said control chamber volume will actuate said mixing means to change the outlet fluid mix temperature.

22. The method of claim 21 including the step of increasing the volume of said control chamber by using spring means for assisting said hydraulic moveable member dividing means.

23. The method of claim 21 wherein step (f) includes the steps of connecting said control chamber with the mixed fluid outlet to decrease the volume in said control chamber and connecting said control chamber with said mixing chamber to increase the pressure in said control chamber.

24. The method of claim 21 wherein step (f) includes the step of pressure balancing the forces associated with the mix means to minimize hydraulically moveable member actuating forces.

25. A method of providing a controlled mix temperature of hot and cold flowing fluids to achieve a selected mixed fluid temperature, said method requiring relatively low energy to operate, comprising the steps of:

a) providing a mixing valve having a mixing chamber, hot and cold fluid inlets, and a mixed fluid outlet;

b) providing control passageways;

c) providing a control valve to permit and prevent flow in at least one said control passageway;

d) providing a hydraulically moveable member responsive to fluid flow to and from said control passageway;

e) providing means for dividing said main chamber into a control chamber and a mixing chamber and for controlling the flow therebetween said mixing chamber being in communication with said inlets and outlet;

f) providing mixing means within said mixing chamber for proportioning the hot and cold fluid entering said inlets for discharge from said outlet, said mixing means being actuated by the movement of said hydraulically moveable member dividing means;

g) establishing a substantially constant pressure drop means across said control chamber to permit said hydraulically moveable member to move said mix means in direct proportion to incremental open time periods of said control valve whereby, long and short duration of said incremental open time periods provide corresponding large and short movements of said movable member with resulting large and small mix temperature changes;

h) monitoring said mixed fluid outlet temperature; and, i) hydraulically increasing and decreasing the volume of said control chamber in response to outlet water temperature whereby a small increase or decrease in said control chamber volume will actuate said mixing means to change the outlet fluid mix temperature.

26. The method of claim 25 including the step of establishing a higher lower constant pressure drop across said control chamber to permit said hydraulically moveable member to move said mix means at a faster or slower constant travel rate.

27. The method of claim 25 including the step of providing a larger or smaller control passage flow area to permit a greater or lesser flow across said hydraulically moveable member to move said mix means at a faster or slower constant travel rate.

28. A method of providing a controlled mix temperature of hot and cold flowing fluids to achieve a selected mixed fluid temperature, said method requiring relatively low energy to operate, comprising the steps of:

a) providing a mixing valve having hot and cold fluid inlets, and a mixed fluid outlet;

b) providing a mixing means and mix chamber for mixing of hot and cold inlet fluid for discharge at said outlet;

c) providing a pressure differential means as a separate member from said mixing means said pressure differential means having an upstream side and a downstream side;

d) providing a hydraulic movable member responsive to said pressure differential means to actuate said mix means, said hydraulically movable member having a high pressure side and a low pressure side;

e) providing at least one control passage communicating a high pressure side and at least one control passage communicating a low pressure side of said hydraulically movable member with respective upstream and downstream sides of said pressure differential means;

f) providing a temperature monitoring means of said mixed fluid;

g) providing a control valve associated with at least one of said control passage ways to control fluid flow in said control passageway thereby actuating movement of said hydraulically movable member and said mixing means to change proportions of hot and cold fluids for mixture temperature control.

29. The valve of claim 28 wherein said pressure differential means is substantially constant.

30. The valve of claim 28 wherein an open position of said control valve moves said hydraulically movable member and said mix means to change proportion of said hot and cold fluids and temperature of said mix fluid discharged from said outlet; and wherein a closed position of said control valves fixes movement of said hydraulically movable member and said mix means to fix proportions of said hot and cold fluids and temperature of said mixed fluid discharged from said outlet.

31. A hydraulically actuated mixing valve for operation within a system for controlling the flow and temperature of hot and cold fluids comprising:

a) a housing having a main chamber comprising:

i. hot and cold fluid inlets for receiving hot and cold supply fluids and an outlet for discharging mixed hot and cold fluids;

ii. a hydraulically movable member disposed within said main chamber, said hydraulically movable member having a high pressure side and a low pressure side, said hydraulically movable member being responsive to fluid pressure differentials;

iii. a mixing chamber formed within said main chamber to mix said hot and cold supply fluids for discharge to said outlet;

iv. internal mixing means associated with said mix chamber, said internal mixing means responsive to movement of said hydraulically movable member;

b) a substantially constant pressure differential means within said housing and in a flow path relationship with said inlet, said mix means, and said outlet for providing sufficient pressure differential across said hydraulically movable member to actuate the movable member and consequently move said mixing means, said substantially constant pressure differential means a separate member within said flow path;

c) at least two control passageways, one connecting said high pressure side of said hydraulically movable member to an upstream side of said substantially constant pressure differential means and the other connecting said low pressure side of said hydraulically movable member to a downstream side of said substantially constant pressure differential means; and, d) a control valve associated with at least one of said control passageways to control fluid flow in said control passageway thereby actuating movement of said hydraulically movable member and said internal mix means to change the proportions of hot and cold fluids for mixture temperature control.

32. The valve of claim 31 wherein an open position of said control valve moves said hydraulically movable member and said internal mix means to change the proportions of hot and cold fluids; and a closed position of said control valve fixes said hydraulically movable member and said internal mix means to fix proportions of hot and cold fluids for mixed temperature control.

33. The valve of claim 32 wherein said flow path is in a series flow path relationship with said inlet, said mix means, and said outlet.

* * * * *